(12) United States Patent
Munshaur et al.

(10) Patent No.: US 7,445,530 B2
(45) Date of Patent: Nov. 4, 2008

(54) AMPHIBIOUS WHEEL, VEHICLE AND METHOD

(76) Inventors: Todd Munshaur, 8350 Savannah Trace Cir., Unit 101, Tampa, FL (US) 33615; Steven Van Osdell, 4608 S. Renellie Dr., Tampa, FL (US) 33611

( * ) Notice: Subject to any disclaimer, the term of this patent is extended or adjusted under 35 U.S.C. 154(b) by 0 days.

(21) Appl. No.: 11/644,470

(22) Filed: Dec. 21, 2006

(65) Prior Publication Data
US 2007/0155257 A1     Jul. 5, 2007

Related U.S. Application Data

(60) Provisional application No. 60/755,494, filed on Dec. 31, 2005.

(51) Int. Cl.
B60F 3/00     (2006.01)
(52) U.S. Cl. .................. 440/12.66; 440/90; 440/98
(58) Field of Classification Search ............ 440/92, 440/90, 93, 98–100, 12.66, 12.67, 12.69, 440/12.7; 441/76, 77; 301/44.2
See application file for complete search history.

(56) References Cited

U.S. PATENT DOCUMENTS

| | | | | |
|---|---|---|---|---|
| 1,777,749 A | * | 10/1930 | Eguiluz | ............ 440/27 |
| 2,980,054 A | * | 4/1961 | Deonard | ............ 440/92 |
| 3,063,071 A | * | 11/1962 | Vorst | ............ 441/77 |
| 3,595,199 A | | 7/1971 | Faxas | |
| 3,628,493 A | | 12/1971 | Headrick | |
| 3,688,731 A | | 9/1972 | Houle | |
| 4,395,237 A | | 7/1983 | Watanabe | |
| 4,473,358 A | | 9/1984 | Viosca, Jr. | |
| 4,664,051 A | | 5/1987 | Newkirk | |
| 4,819,575 A | * | 4/1989 | Dixon | ............ 440/12.7 |
| 5,058,643 A | | 10/1991 | Nakasaki | |
| 5,755,602 A | | 5/1998 | Klukowski | |
| 6,050,864 A | | 4/2000 | Perdue | |
| 6,247,981 B1 | | 6/2001 | Farley et al. | |
| 2004/0087224 A1 | | 5/2004 | Hart | |

FOREIGN PATENT DOCUMENTS

| GB | 2149362 A | 6/1985 |
|---|---|---|
| JP | 58000405 A2 | 1/1983 |

* cited by examiner

*Primary Examiner*—Ed Swinehart
(74) *Attorney, Agent, or Firm*—Christopher J. Kay (57) ABSTRACT

An amphibious vehicle for one or more operators is equipped with four buoyant amphibious propulsion wheels, the wheels having a number of collapsible pockets disposed about the surface of the wheel. Each pocket comprises an opening oriented in the direction of rotation of the wheel and an outlet means distal to the opening for draining the pocket. Methods for using the amphibious wheel are also disclosed.

15 Claims, 7 Drawing Sheets

AMPHIBIOUS WHEEL, VEHICLE AND METHOD

CROSS-REFERENCE

The present application claims priority from U.S. Provisional Patent Application No. 60/755,494 filed Dec. 31, 2005, the contents of which are hereby incorporated in their entirety by reference, and which is not admitted to be prior art by its mention in the background.

FIELD OF THE INVENTION

The present invention relates to amphibious wheels, amphibious vehicles, and methods for amphibious propulsion. More particularly, the present invention relates to amphibious vehicles having wheels adapted for amphibious propulsion and to the use of said amphibious wheels.

BACKGROUND

Recreation at the beach typically includes both land and water activities, and can include the use of diverse water and land craft.

A wide variety of recreational watercraft are known. For example, watercraft comprising a hull and a pair of paddle wheels are taught in U.S. Pat. No. 6,247,981 B1. Attempts have been made to adapt recreational watercraft for use on land, or conversely to adapt recreational land vehicles for use on water.

U.S. Patent Publn. No. U.S. 2004/0087224 A1 teaches an aquatic vehicle having a frame suspended between a pair of large flotation wheels equipped with paddles mounted to the sides of the wheels. The wheels are pedal-driven, and the vehicle is capable of being propelled across level ground or over water.

U.S. Pat. No. 3,595,199 discloses an engine-driven boat hull comprising wheels for propulsion on land and an engine-driven, water jet propulsion system for propulsion on water. Similarly, U.S. Pat. No. 4,473,358 teaches a hulled watercraft equipped with propulsion wheels capable of producing forward thrust and also of exerting a downward pressure upon the water to lift the hull and thereby reduce hull drag. The axles of this vehicle may further comprise tires for propulsion on land.

Bicycles that are adaptable for use on water by the attachment of pontoons are described in U.S. Pat. Nos. 6,050,864 and 4,395,237.

However, each one of these references suffers from one or more of the following disadvantages: the wheels may be overly large, making land travel difficult except over smooth, hard, level surfaces; designs in which the frame is suspended from only one pair of wheels may be unstable when entry of the vehicle is attempted from water; paddles or other aquatic drive means that are positioned on the sides of a wheel or paddle in order to permit land travel may be inefficient for propulsion in water; the weight and/or complexity of the design may require a motor; and time-consuming addition or removal of flotation devices may be required when transitioning between water and land.

The drive means of an amphibious vehicle must be efficient if the amphibious craft is to be satisfying, fun, and practical. It is therefore desirable to minimize drag and other mechanical losses. For example: losses in the drive train should be minimized; the use of fixed flotation devices such as hulls or pontoons, which produce substantial drag in water, should be avoided; wheels should be of a suitable size for maneuverability on land; and the use rudders, which also produce substantial drag in water, should be avoided.

Attempt to address issues related to efficient drive means for amphibious vehicles can be found, for example, in U.S. Pat. No. 3,628,493, which discloses an aquatic impellor wheel with impact surfaces capable of producing upward thrust when rotated in water, and U.S. Pat. No. 5,058,643, which discloses a tire comprising tread blocks adapted to provide both propulsion on water and traction on land. However, these approaches suffer from one or more of the following disadvantages: the power required to produce significant upward thrust on water is high; and a tire tread provides only limited traction in water.

For the foregoing reasons, there is a need for a lightweight, buoyant, and maneuverable amphibious vehicle capable of efficient propulsion on both land and water, and which is capable of moving between water and land without the need for mechanical adjustment. All this and more will become apparent to one of ordinary skill upon reading the disclosure, figures, and claims appended hereto.

SUMMARY

The present invention is directed to an amphibious wheel that provides efficient propulsion on both land and water, and to an amphibious vehicle comprising said wheel that satisfies the need for a lightweight, enjoyable, and maneuverable vehicle capable of efficient propulsion on both land and water, and which is capable of transitioning between water and land without the need for mechanical changes or adjustments.

In a first embodiment, the invention is directed to a wheel for amphibious propulsion. An amphibious wheel according to the present invention comprises a buoyant toroid, such as an inflatable inner-tube or rigid or semi-rigid foam toroid, the toroid comprising an outward rolling surface for contacting the water or land and a central hub for mounting the wheel to a rotatable axle to permit the wheel to rotate in a preferred direction. The wheel further comprises a plurality of collapsible pockets that are disposed substantially about the outward rolling surface, whereby the pockets contact the land or water when the wheel rotates. The pockets comprise an opening that is oriented in the direction of the preferred rotation of the wheel. The pockets further comprise an outlet means disposed distal to the opening for draining the pocket. In use on water, it is desirable to drain the water quickly from the pocket once it rotates above the level of the water in order to increase the efficiency of propulsion by minimizing the lifting of water. The present inventors have surprisingly found that the outlet means of the wheel according to the present invention can drain water from the pocket sufficiently rapidly that the amount of traction obtained upon the water is not unduly decreased, thereby providing an efficient amphibious wheel.

Thus, in operation on water, rotation of a wheel according to this first embodiment causes each pocket to enter the water in turn. Upon entry into the water, each pocket rapidly fills with water and thereby provides resistance to further rotation of the wheel and traction for the amphibious wheel. As each pocket is raised above water level by further rotation of the wheel, water quickly drains from the pocket primarily via the outlet means so that energy is not wasted lifting water. Upon transition of the amphibious vehicle from water to land, the weight of the amphibious vehicle collapses each pocket in turn so that the pockets do not interfere with the traction of the wheel upon land, but instead can enhance traction according to the selected material of the pocket, its shape, and the nature of the surface being traversed.

In a second embodiment, the present invention is directed to an amphibious vehicle comprising a frame with a pair of axles, at least one seat, a steering means for steering the wheels of at least one axle, and a drive means for propelling the wheels comprising, for example, the combination of pedals, one or more chains and sprockets. At least one of the wheels is adapted for amphibious propulsion and comprises a buoyant toroid having an outward rolling surface and a central hub, the wheel further comprising a plurality of collapsible pockets disposed substantially about the outward rolling surface, at least one said pocket comprising an opening oriented in the direction of rotation of the wheel and an outlet means disposed distal to the opening for draining the pocket.

In a third embodiment, the present invention is directed to a method for rotating an amphibious wheel, the method comprising, in a first step, contacting land or water with an amphibious wheel according to the first embodiment, wherein the wheel comprises a buoyant toroid comprising an outward rolling surface, a central hub, and a plurality of collapsible pockets disposed substantially about the outward rolling surface, at least one said pocket comprising an opening oriented in the preferred direction of rotation of the wheel and an outlet means disposed distal to the opening for draining the pocket. The second step comprises torquing the wheel in the preferred direction of rotation of said wheel. For example, the wheel can be torqued by a person operating a pedal, chain and sprocket. Alternatively, an engine or other source of torque can be used.

In a fourth embodiment, the present invention is directed to a method for rotating an amphibious wheel, the method comprising contacting a wheel according to the first embodiment to land or water that is moving relative to the wheel. By this method, the wheel is caused to rotate, and the rotation can be used, for example, to generate electricity where the wheel is operably connected to a generator.

It is therefore a first object of the present invention to provide an energy-efficient amphibious vehicle.

It is a further object of the present invention to provide an efficient wheel for an amphibious vehicle, whereby efficient propulsion is obtained on land and in water without the need to mechanically alter or adjust the vehicle when transitioning from water to land, or vice versa.

It is a further object of the present invention to provide a lightweight and maneuverable amphibious vehicle capable of human-powered propulsion over a variety of terrains, including sandy, rocky, or uneven terrains.

It is also an object of the present invention to provide an amphibious vehicle capable of operation by one or more persons, in which the drive means for front and back axles can be driven separately.

It is also an object of the present invention to provide an amphibious vehicle comprising a steering means whereby the front and rear axles can be independently steered for enhanced maneuverability.

It is yet a further object of the present invention to provide a wheel for use on land or in the water that is capable of being used for propulsion, or that can be efficiently driven by contacting the wheel to land or water that is moving relative to the wheel.

BRIEF DESCRIPTION OF THE DRAWINGS

These and other features, aspects, and advantages of the present invention will become better understood with regard to the following description, appended claims, and accompanying drawings where:

DESCRIPTION

As used herein, the term "land" includes diverse terrain, such as, without limitation, beaches, dunes, grassland, rocky terrain, roads, shallow riverbeds, and the like.

Figure 1:
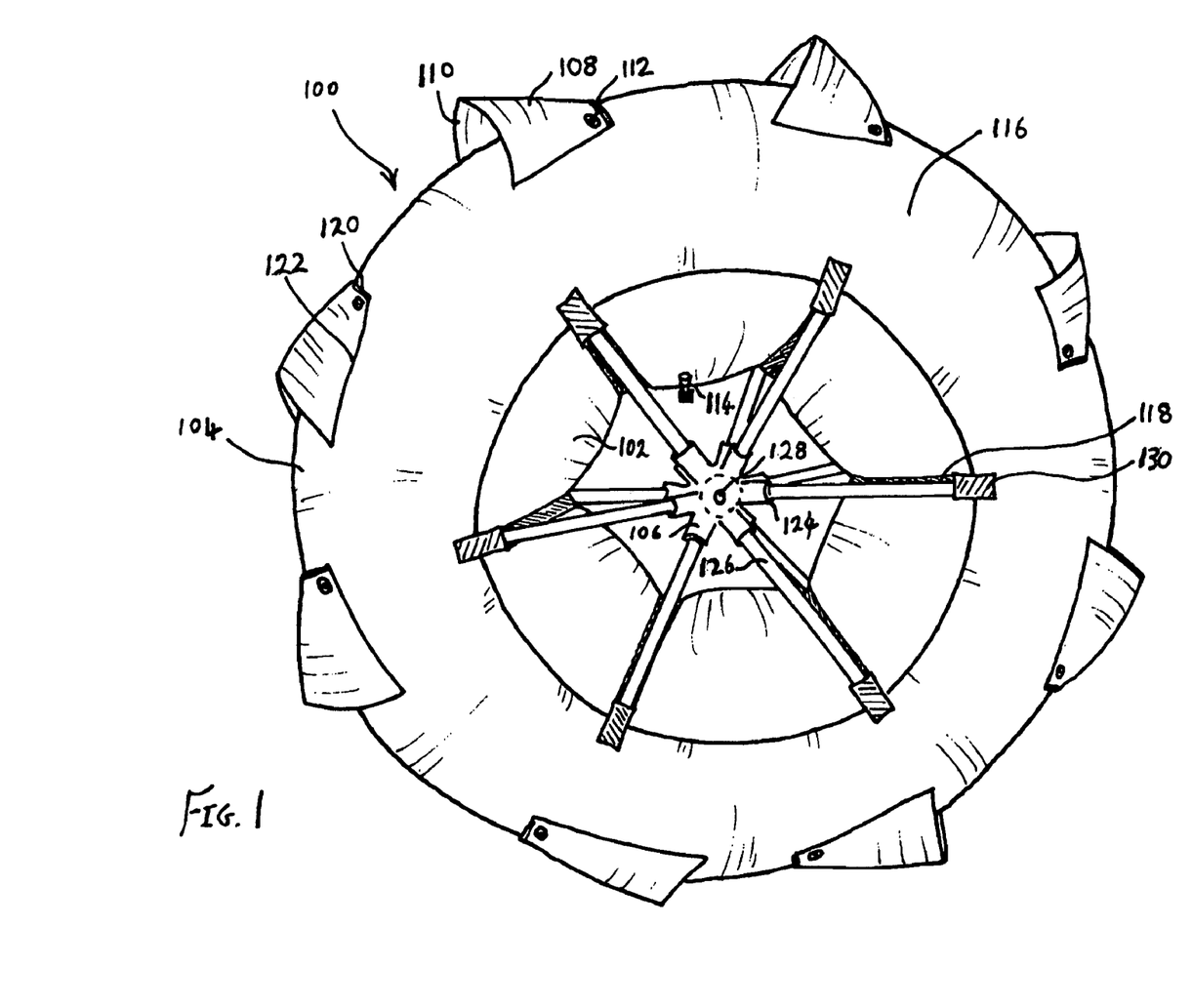
FIG. 1 shows an isometric view of an embodiment of an amphibious wheel according to the present invention.

Referring now to FIG. 1, an embodiment of an amphibious wheel 100 according to the present invention comprises buoyant toroid 102 with outward rolling surface 104 and central hub 106. A plurality of collapsible pockets 108 is disposed substantially about outward rolling surface 104. Each pocket 108 comprises an opening 110 oriented in the principal direction of rotation of the wheel 100. The principal direction of rotation is the direction in which the wheel is primarily intended to be used. Thus, in amphibious vehicle embodiments, the openings 110 of the pockets 108 face forward. Each pocket 108 further comprises at least one outlet means 112 for draining the pocket.

Buoyant toroid 102 is preferably an inflatable rubber toroid, such as a rubber inner tube equipped with inflation valve 114. However, any resilient material capable of providing sufficient buoyancy in water and mechanical stability on land can be used to form the toroid. For example, a polymeric rigid or semi-rigid foam toroid can be used.

Collapsible pockets 108 can be integral to outward rolling surface 104 of buoyant toroid 102, or, more preferably, are integral to a belt 116 affixed to the outward rolling surface 104. Belt 116 can be formed of canvas, rubber, polymer impregnated fabric, or like fabric, and the belt can be mounted to buoyant toroid 102 by any suitable means, such as by ties 118 extending from each side of the belt about the inner surface of the buoyant toroid 102. Advantageously, the belt 116 can be detached from the wheel if the pockets are damaged or worn, and the belt 116 replaced.

Each pocket 108 comprises an opening 110. Pocket 108 can be formed, for example, from a piece of fabric having a length and width comparable to the width of buoyant toroid 102 and attached to the belt on three sides: the rear 120 and sides 122 of the pocket. The sides 122 of the pocket 108 are preferably disposed so that the opening is naturally open when the belt 116 is attached to the wheel. The pockets 108 are capable of deforming when the wheel contacts the ground, and can optionally be constructed to enhance the traction of the wheel when the vehicle is operated on land.

The number of pockets 108 about the wheel is selected so that, when operated on water, at least one pocket contacts the water during operation at all times. Thus, the number of pockets is preferably between about 4 and about 16, and is most preferably about 8. However, embodiments comprising a large number (from 8 to more than one hundred) of small, closely spaced, pockets are also considered to be within the scope of the present invention.

In the embodiment of FIG. 1, central hub 106 comprises a spoke receptacle 124 for retaining a plurality of spokes 126 radiating therefrom. Spoke receptacle 124 is preferably made of a lightweight metal, such as aluminum, and comprises a central channel 128 adapted to mount to an axle.

Figure 2:
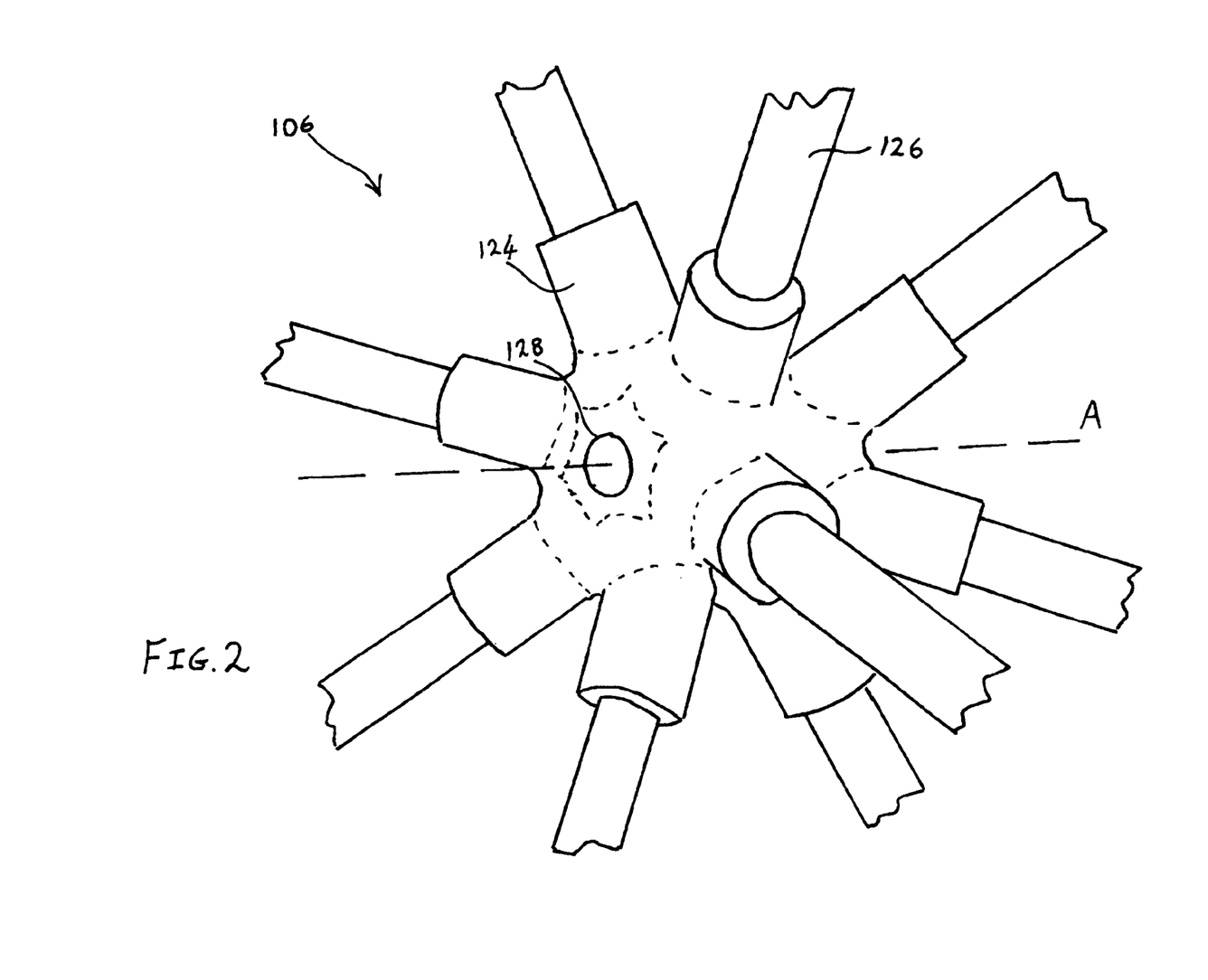
FIG. 2 shows an isometric view of a hub of the amphibious wheel of FIG. 1.

In FIG. 2, central hub 106 is shown in greater detail and comprises axis of rotation A.

The spokes 126 can be formed of any rigid material of suitable strength. For example, wood, metal, fiber glass, or carbon fiber spokes can be used. Preferably, the material is of low density, such as carbon fiber or aluminum, and can be a tube, I-beam, or other cross-section of sufficient strength. In the embodiment of FIG. 1, the spokes 126 are arranged pairwise about spoke receptacle 124, whereby the distal ends of each spoke pair contact the inner and outer faces of buoyant toroid 102.

Support strap 130, 118 can be attached to the distal ends of the spoke pairs to support the inner surface of the toroid 102. For an inflatable buoyant ring, inflation of the ring increases the tension of support strap 130, fixing the central hub 106 in position with sufficient stiffness to permit operation of the amphibious wheel 100.

Figure 3:
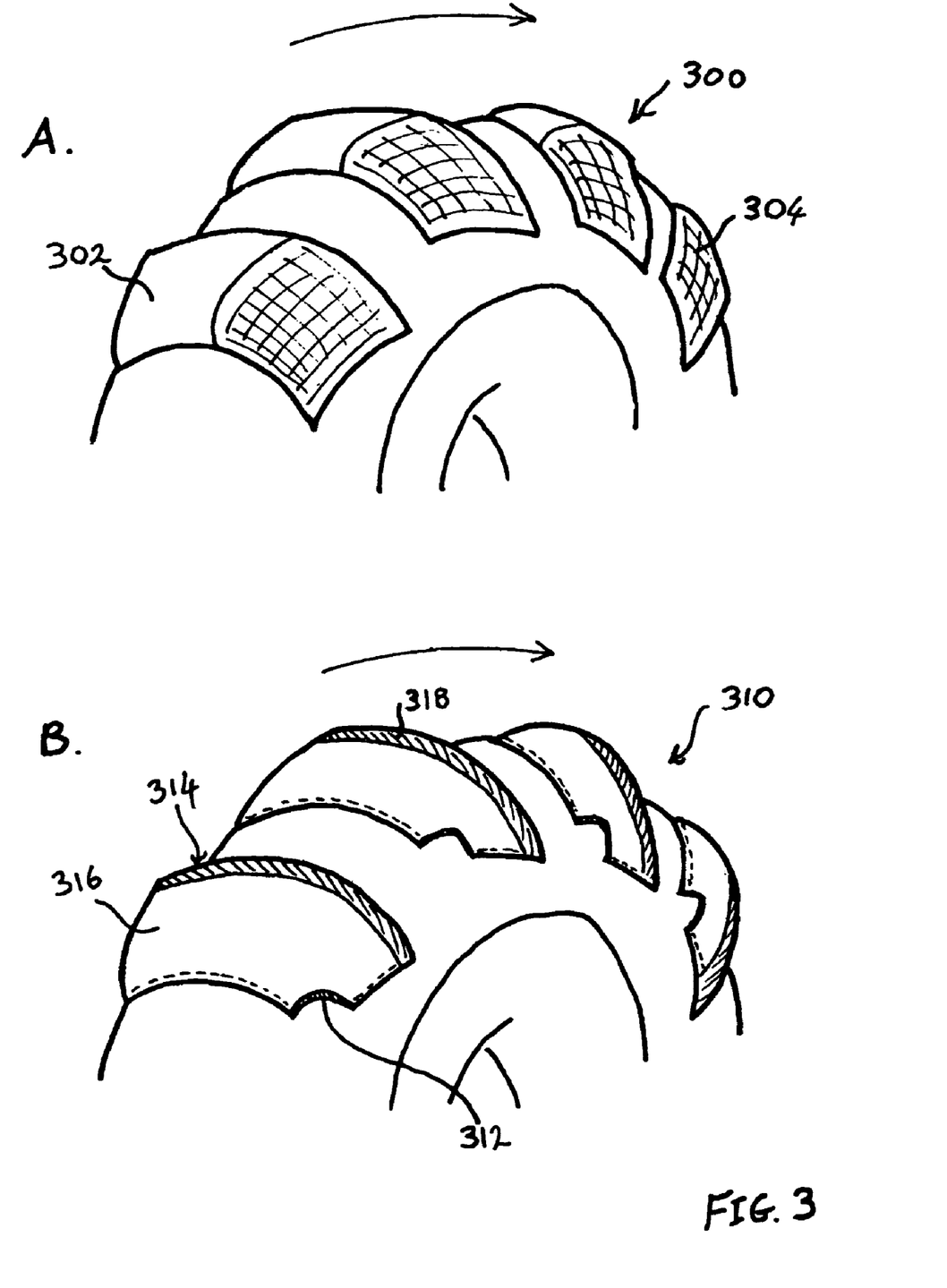
FIG. 3 shows isometric views of alternative pocket embodiments of an amphibious wheel according to the present invention.

Referring now to FIG. 3, two alternative embodiments of the pocket of an amphibious wheel according to the present invention are shown. In the embodiment of FIG. 3A, wheel 300 comprises pockets 302 in which a portion of the pocket material 304 is a water porous mesh. Preferably, about onehalf of the area of the pocket is mesh 304. The location of the mesh within the pocket is not particularly limited. In preferred embodiments, the mesh is located towards the side of the wheel 300 on which water discharge is preferred. For example, in the vehicle according to the present invention, it is preferred that the mesh portion be positioned to direct water flow away from the vehicle. The mesh can be of any material of suitable tensile strength, and the fineness or coarseness of the mesh can be selected to optimally adjust the rate of drainage of the pocket.

In FIG. 3B, wheel 310 is shown in which the outlet means is cutaway 312. Other outlet means can include, for example, one or more eyelets, slits, or tubes connecting the interior and exterior of the pocket. Optionally, the opening 314 of pocket 316 can further comprise a brace 318 capable of securing the opening 314 open when no load is applied to the pocket. Suitable braces 318 include, but are not limited to, resilient steel, plastic, or fiberglass stiffeners forming a part of the pocket adjacent the opening 314.

Figure 4:
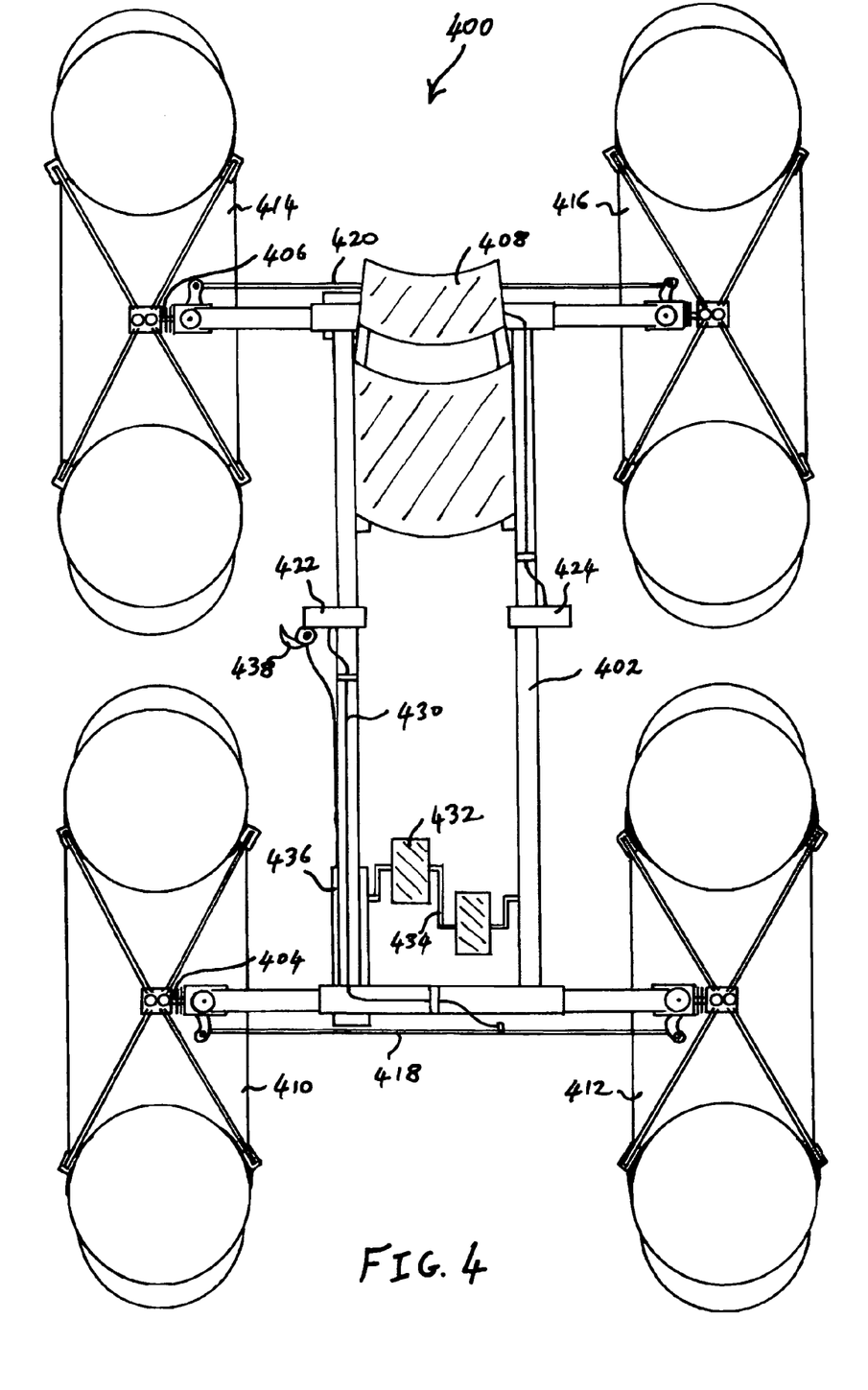
FIG. 4 shows a top view of an embodiment of an amphibious vehicle according to the present invention in which the wheels are shown in section.

Referring now to FIG. 4, there is shown an embodiment of an amphibious vehicle 400 according to the present invention. Frame 402 is attached to a pair of axles 404, 406. At least one seat 408 is mounted to frame 402 to accommodate at least one operator. Wheels for amphibious propulsion according to the present invention 410, 412, 414, 416 are arranged as a first pair 410, 412 and a second pair 414, 416 rotatably attached to the two axles 404, 406, respectively.

Vehicle 400 further comprises a steering means comprising tie bars 418, 420 steeringly connected to the wheels by levers 422, 424 pivoting about pivots 426, 428. Tie bars 418, 420 are connected to levers 422, 424 by cable 430, whereby an operator can move the levers to steer the wheels.

In the embodiment of FIGS. 4-7, the two axles 404, 406 are steered independently using handles 422 and 424, respectively. However, in other embodiments, one or both axles can comprise steering means, and in embodiments in which both axles comprise steering means, the two means can be independent or linked. Other steering means can include, without limitation, steering means comprising a steering wheel, hydraulic steering, or rack and pinion steering, as are well known in the vehicular arts.

Vehicle 400 further comprises a drive means. In the embodiment of FIGS. 4-7, the drive means is a pedal drive comprising a pair of pedals 432 pivotably connected to a crank 434 connected via a chain and a gearbox 436 mounted to frame 402 to the axles 404, 406. Gear ratios are selected that are useful for operation on water and for the range of terrains for which the vehicle is intended to be used. Specifically, the number of teeth of the crank and axle sprockets is considered in relation to the gear ratios provided by the gearbox and the diameter of the wheels in order to provide appropriate gearing according to well-known mechanical principles. For example, low gears can be provided for operation over uneven ground or on an incline, while higher gears can be provided for rapid movement over water or downhill. Preferably, from 3 to 15 gear ratios can be provided, and most preferably five gear ratios are provided. Gear shifting can be accomplished, for example, by a gear lever 438 affixed to the frame, or by a rotational device housed within a steering lever 422. Such devices are well known in the cycling art for shifting gears by rotation of a handlebar grip.

Figure 5:
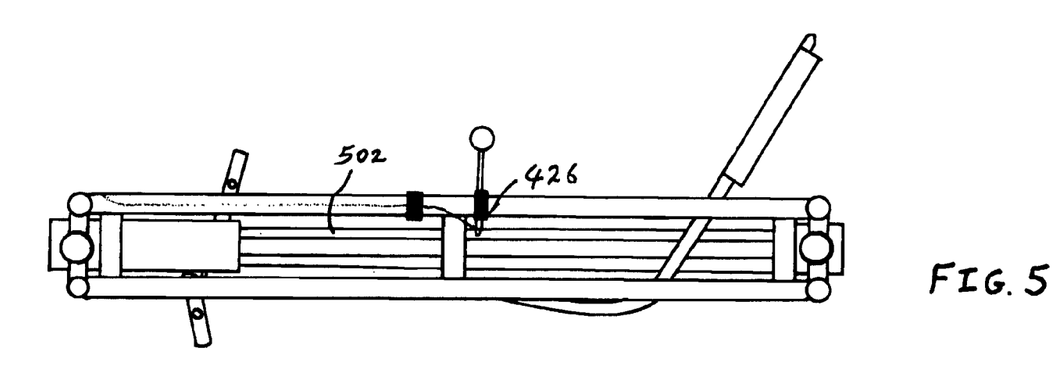
FIG. 5 shows a side view of the frame, without wheels, of the amphibious vehicle of FIG. 4.
Figure 6:
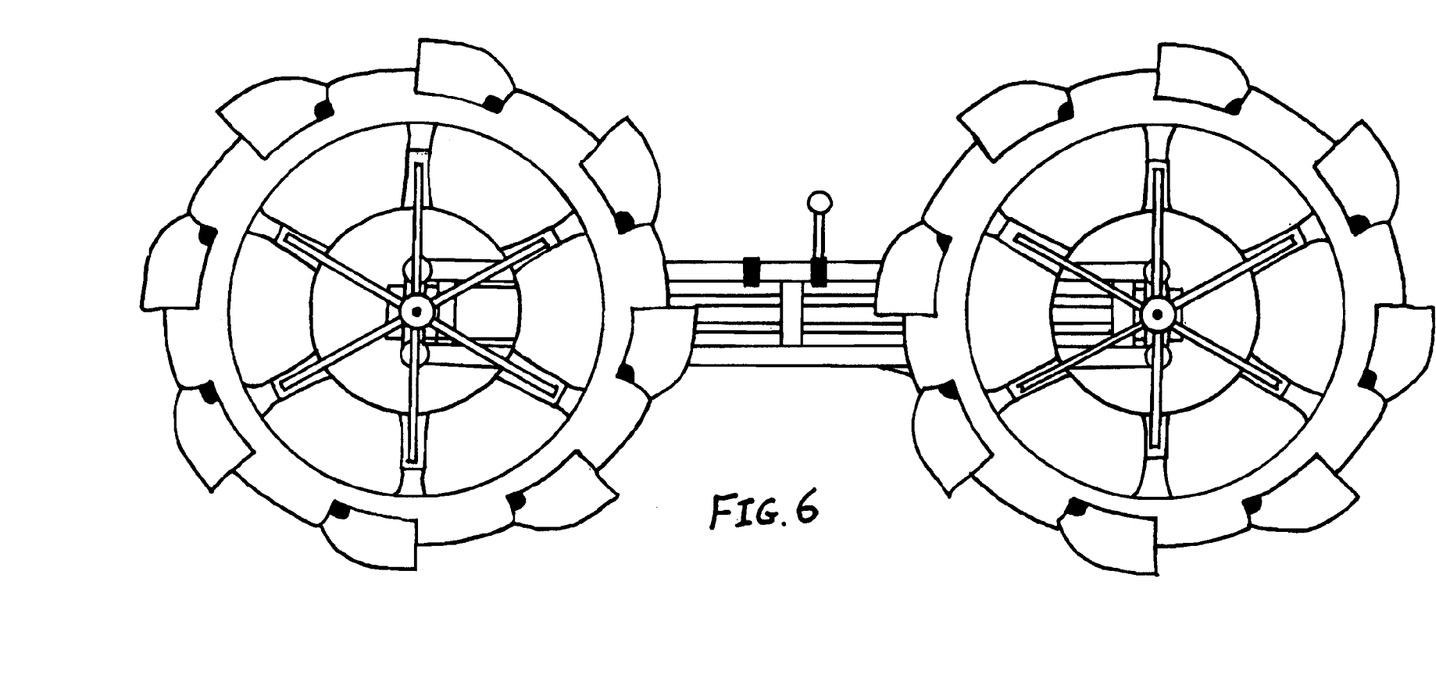
FIG. 6 shows a side view of the amphibious vehicle of FIG. 4.
Figure 7:
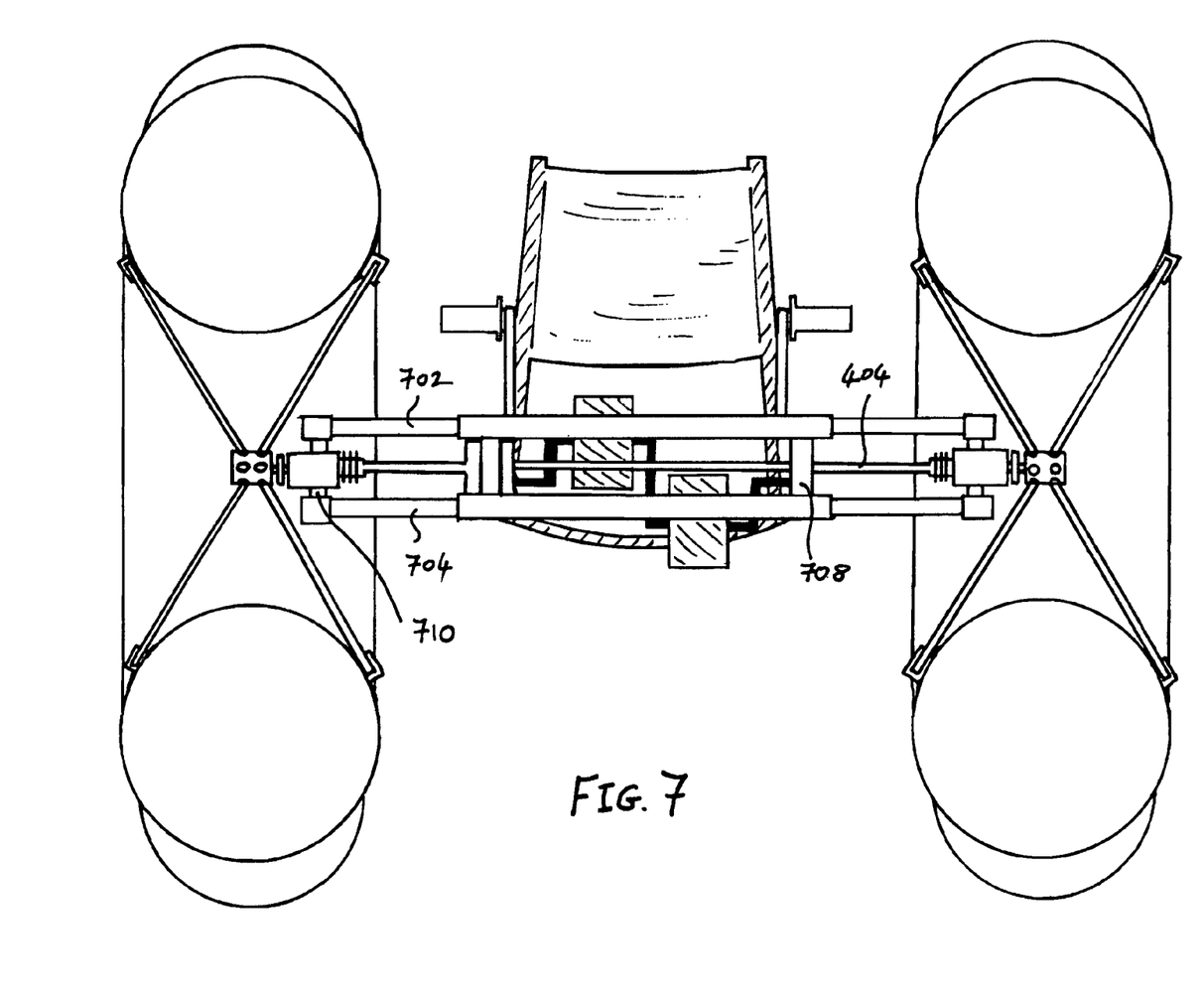
FIG. 7 shows a front view of the amphibious vehicle of FIG. 4 in which the wheels are shown in section.

Referring now to FIGS. 5-7, different views are shown in which the drive means is connected to both axles 110, 112 by a chain within enclosure 502 which is preferably watertight. The drive means can drive one or both axles. Separate drive means can be provided for each axle and, for example, driven by different operators. Thus, separate pedals can be provided for each operator, and each pair of pedals can be arranged to drive one or both of the axles. In this manner, for example, one operator can operate the front axle, while a different operator drives the rear axle.

It will be readily appreciated that other drive means are possible, for example in place of a crank, step pedals may be used to provide drive to the gearbox 436 or a conventional elliptical cross trainer can be used so that both the hands and legs are used to power the vehicle. A drive shaft can also be used. The present invention is not limited to human-powered drive means, but also encompasses embodiments in which the drive means comprises a motor or engine, such as a gas-driven four-stroke or two-stroke engine. Preferably, the drive means is enclosed or otherwise protected from water damage.

The construction of the frame 402 is not particularly limited. Preferably, the frame 402 comprises a substantially rectangular arrangement of tubes, such as welded aluminum tubes.

The frame 402 can be constructed to accommodate seats 408 for one or more operators, preferably from one to four operators. In embodiments accommodating two operators, the two operators can be accommodated side by side in adjoining relation, or one behind the other.

Optionally, the drive means can further comprise a braking means. For example, hub brakes that are well known in the cycling art can be used whereby applying a reverse pressure to the crank causes a braking force to be exerted on at least one of the wheels.

Referring now to FIGS. 5 and 6, side views of the frame of an embodiment of the amphibious vehicle are shown to illustrate an arrangement of the components of the drive means, comprising pedals 432, crank 434, gearbox 436, a chain enclosed within a watertight cover 502, the chain drive extending to sprockets for driving the front and rear axles.

Referring now to FIG. 7, a front cutaway view of an embodiment of the amphibious vehicle according to the present invention is shown illustrating the relation of the upper front frame member 702 and lower front frame member 704 to the front axle. The frame is optionally reinforced by one or more struts 708 connecting frame members. A pivot 710, such as a U-joint, is provided to permit steering of the wheels relative to the frame.

In use, the amphibious vehicle of FIGS. 4-7 can readily be assembled or disassembled, facilitating its transport to and from a destination such as a beach. For example, the wheels can be detached from the frame, the buoyant ring deflated and the belts detached, the spokes and hubs removed from the ring, the hub detached from the spokes, and the flexible spoke braces detached from the spokes. The amphibious vehicle can be assembled on land, and one or more operators can enter the vehicle. A suitable gearing is selected and the vehicle can be operated on a variety of terrains.

Figure 8:
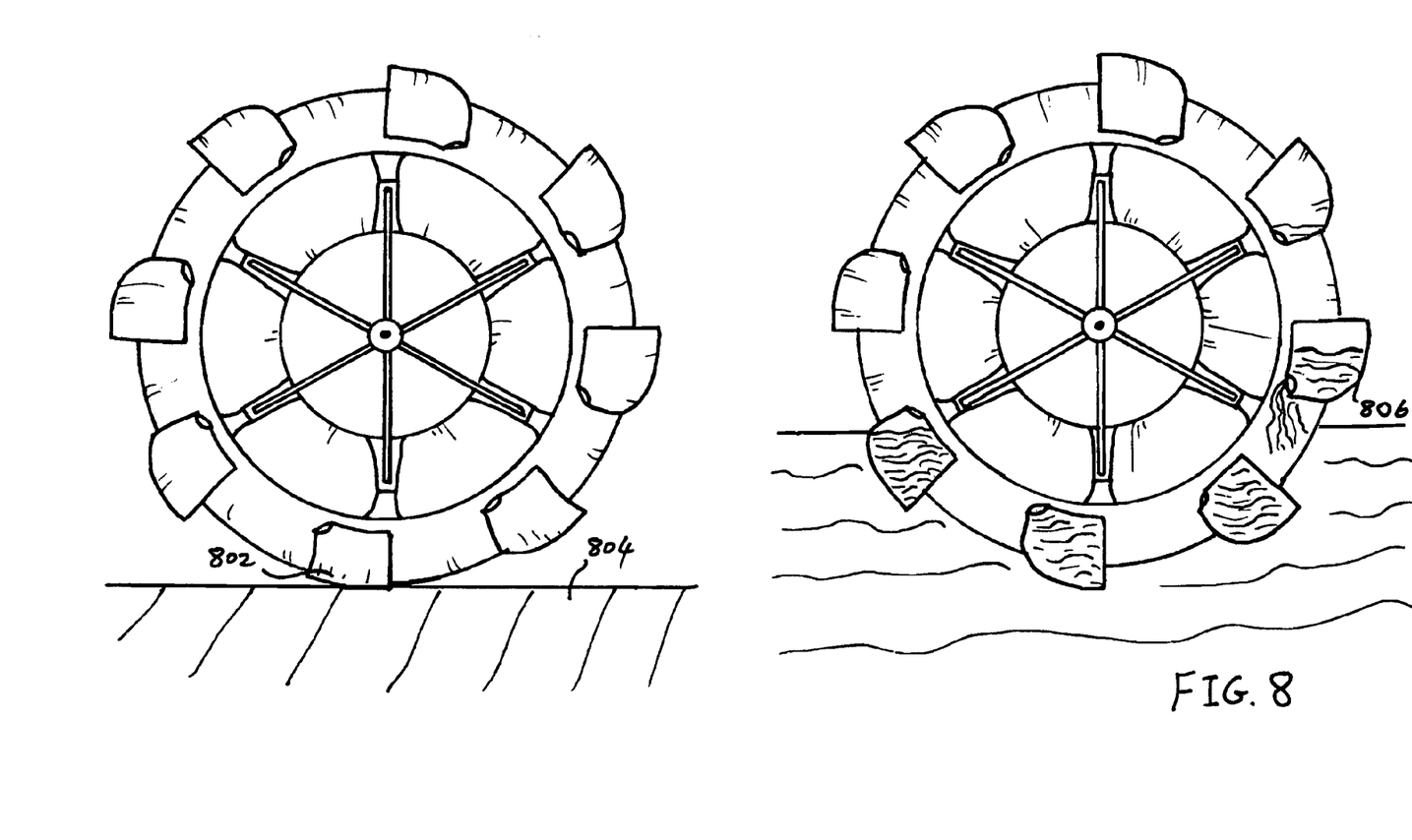
FIG. 8 shows a schematic view of the operation of an embodiment of an amphibious wheel according to the present invention, (A) on land, and (B) in water.

Referring now to FIG. 8A, in operation on land, the mass of the vehicle is sufficient to substantially close the pockets 802 upon their contact with the ground 804, whereby the pockets do not provide an uneven contact surface for the wheel.

Referring now to FIG. 8B, upon entry into the water, no mechanical adjustments or changes are required, although a gear change can be made if desired. As the wheel rotates in a forward direction, the pockets are brought sequentially into contact with the water. In use on water, each pocket fills and provides resistance to the wheels rotation in the water, which results in a forward thrust applied to the vehicle. Once the wheel rotates such that the water-filled pocket 806 is raised above the level of the water, the pocket drains so that energy is not wasted in raising water-filled pockets.

It will be apparent that the amphibious wheel according to the present invention can be used for propulsion when torqued. In addition, the wheel can be driven by contacting it to moving land or water.

Although the present invention has been described in considerable detail with reference to certain preferred versions thereof, other versions are possible. For example, other wheel configurations, materials, drive means, steering means, and the like, can be envisaged within the scope and spirit of the present invention. Therefore, the spirit and scope of the invention should not be limited to the description of the preferred versions contained herein.

Now that the invention has been described:
What is claimed is:

1. A wheel for amphibious propulsion comprising:
   a buoyant toroid comprising an outward rolling surface and a central hub; and
   a plurality of collapsible pockets disposed substantially about the outward rolling surface, at least one said pocket comprising an opening oriented in the direction of rotation of the wheel and an outlet means disposed distal to the opening for draining the pocket.

2. The buoyant wheel of claim 1, in which the plurality of pockets comprises from about 4 to about 16 pockets.

3. The buoyant wheel of claim 1 further comprising a belt secured to the outward surface of the wheel, the belt comprising the pockets.

4. The buoyant wheel of claim 1, in which the outlet means comprises a mesh.

5. The buoyant wheel of claim 1, in which the outlet means is positioned to drain said pocket towards one side of said wheel.

6. The buoyant wheel of claim 1, in which the pocket comprises a brace capable of holding the pocket opening open when no load is applied to the pocket.

7. The buoyant wheel of claim 1, in which the pocket comprises canvas, rubber, nylon, or Kevlar.

8. An amphibious vehicle comprising:
   a frame comprising a pair of axles having a direction of rotation, at least one seat, a steering means, and a drive means; and
   a plurality of wheels, at least one wheel comprising a buoyant toroid comprising an outward rolling surface and a central hub, the wheel further comprising a plurality of collapsible pockets disposed substantially about the outward rolling surface, at least one said pocket comprising an opening oriented in the direction of rotation of the wheel, and an outlet means disposed distal to the opening for draining the pocket, wherein the steering means and drive means are operably connected to said wheels.

9. The amphibious vehicle of claim 8 in which the drive means comprises at least one pair of pedals operably connected to a chain, gears, and at least one said axle.

10. The amphibious vehicle of claim 8, further comprising a braking means.

11. The amphibious vehicle of claim 8, comprising one seat.

12. The amphibious vehicle of claim 8, comprising two adjoining seats.

13. The amphibious vehicle of claim 8, comprising two seats, one seat behind the other.

14. The amphibious vehicle of claim 8, comprising an independent steering means operably connected to each axle.

15. The amphibious vehicle of claim 8, in which said steering means comprises one or more handles pivotably affixed to said frame, the handle and wheel being steeringly connected by a cable.

* * * * *